United States Patent
Nixon et al.

(10) Patent No.: US 8,099,669 B2
(45) Date of Patent: Jan. 17, 2012

(54) ENHANCED UNIFIED MESSAGING SYSTEM WITH A QUICK VIEW FACILITY

(75) Inventors: Steve Nixon, Toronto (CA); Paul Michael Brennan, Toronto (CA)

(73) Assignee: Nortel Networks Limited, Mississauga, Ontario ( * ) Notice: Subject to any disclaimer, the term of this patent is extended or adjusted under 35 U.S.C. 154(b) by 1000 days.

(21) Appl. No.: 09/735,499

(22) Filed: Dec. 14, 2000

(65) Prior Publication Data

US 2002/0101453 A1    Aug. 1, 2002

(51) Int. Cl.
*G06F 3/048* (2006.01)
(52) U.S. Cl. ........................................ 715/752; 715/810
(58) Field of Classification Search ............... 345/810, 345/902, 772, 853; 379/201.04, 201.05; 707/10; 715/752, 810
See application file for complete search history.

(56) References Cited

U.S. PATENT DOCUMENTS

| | | | | |
|---|---|---|---|---|
| 5,943,055 A | * | 8/1999 | Sylvan | 345/839 |
| 6,181,837 B1 | * | 1/2001 | Cahill et al. | 382/305 |
| 6,385,644 B1 | * | 5/2002 | Devine et al. | 709/206 |
| 6,396,513 B1 | * | 5/2002 | Helfman et al. | 345/752 |
| 6,489,977 B2 | * | 12/2002 | Sone | 345/835 |

OTHER PUBLICATIONS

Miller, Eric. "Background Polling." Microsoft Outlook Express Jul. 30, 1998: p. 1. [Online] Available http://www.okinfoweb.com/moe/connect/connect002.htm.*

* cited by examiner

*Primary Examiner* — Namitha Pillai

(57) ABSTRACT

This invention provides an enhancement to messaging systems by providing a message notification feature which allows a user to manage only new messages for which a notification has not yet been cleared without having to access or download the entire set of messages. This management may be performed in single window that operates in conjunction with an application associated with the messaging system. The notification management permits manipulation of the message notifications without influencing the status of the messages themselves, while providing access to the data contained in these messages. This addresses the needs of those users who frequently check their incoming communications queues and need to determine very quickly which items need urgent attention and which ones can be deferred. The present invention further provides specific functionalities for handling a particular message when it does need urgent attention.

20 Claims, 1 Drawing Sheet

ENHANCED UNIFIED MESSAGING SYSTEM WITH A QUICK VIEW FACILITY

FIELD OF INVENTION

The present invention relates to messaging systems as well as features used therein to provide notification of various types of messages that are available to a user.

BACKGROUND OF INVENTION

Messaging systems such as computer telephony messaging, unified messaging and unified communication systems are used in order to manage different types of messages that may be sent to a particular user. An example of such a system is the CallPilot™ desktop unified messaging communication system by Nortel Networks™. The messages in such a system may be voice, facsimile, electronic mail, video or data messages. The complex relationships between various competing messages and the client expectations associated therewith require an efficient management of a number of different message types which may arrive simultaneously. For instance, in some situations it is often desirable to initiate immediate response on certain incoming messages while others may not require immediate response. These types of situations may arise in such places as hospital emergency rooms, stock brokerage firms, air traffic control centers, shipping and receiving areas, etc.

In prior art systems, a telephone system may present a list of notifications of messages that are waiting for a particular user. Many such systems incorporate notifications of messages sent to the user over a system other than the telephone system, such as an electronic mail system. The user can clear the system-provided notifications individually or all at once. Such messaging systems, however, offer either no access or limited access to the messages themselves.

Many of the existing systems tend to focus on either voice message or electronic mail management, but generally not both. These systems generally sort messages into a variety of categories based on their status, such as "old", "saved", "read" or "new". The "new" messages are continually presented to the user in the message list until the user chooses to deal with them. Moreover, it is sometimes necessary to retrieve a set of messages in their entirety in order to simply verify if a particularly important message has been received. As such, these systems tend to be focused on managing all of the messages that may be contained in a user's mailbox, which is not convenient for situations mentioned earlier where immediate action on certain incoming messages is necessary. Furthermore, such existing systems do not well integrate e-mail, voice mail, and calls with no message attached.

SUMMARY OF INVENTION

It is an object of the present invention to provide a method of managing only new messages or those messages for which a notification has not yet been cleared without having to access or download the entire set of messages.

According to an aspect of the invention, there is provided a messaging system having integrated therewith a message notification means, said message notification means comprising: memory means for storing notification status for messages in said messaging system; a user interface for providing to a user a list of new messages for which a notification has not been cleared; said message notification means permitting the user to select a particular notification from said list for manipulation.

According to another aspect of the invention, there is provided a method of enhancing a messaging system, said method comprising the steps of: providing a message notification application integrated with a messaging application of said messaging system; identifying a set of new messages for which a notification has not been cleared; presenting, to a user by said message notification means, a list of said set of new messages via a user interface; and permitting said user to select a particular message notification from said list for manipulation.

According to yet another aspect of the invention, there is provided a message notification means for use with one or more messaging systems, said message notification means comprising: polling means for polling said one or more messaging systems for new messages; memory means for storing notification status for messages in said messaging system and for storing a variable relating to each message; a user interface for providing to a user a list of new messages for which a notification has not been cleared; said message notification means permitting the user to select a particular notification from said list for manipulation.

According to a further aspect of the invention, there is provided a method of providing message notifications to a user, said user having access to one or more messaging systems, said method comprising the steps of: providing a message notification means for use with said one or more messaging systems; polling said one or more messaging systems, by said message notification means, for new messages; identifying a set of new messages for which a notification has not been cleared; presenting, to said user by said message notification means, a list of said set of new messages via a user interface; and permitting said user to select a particular message notification from said list for manipulation.

According to yet another aspect of the invention, there is provided a message notification means for use with one or more messaging systems, said message notification means comprising: receiving means for receiving indications from said one or more messaging systems regarding the presence of new messages therein; memory means for storing notification status for each message in said messaging system; a user interface for providing to a user a list of new messages for which a notification has not been cleared; said message notification means permitting the user to select a particular notification from said list for manipulation.

According to a further aspect of the invention, there is provided a method of providing message notifications to a user, said user having access to one or more messaging systems, said method comprising the steps of: providing a message notification means for use with said one or more messaging systems; receiving, at a receiving means within said message notification means, indications from said one or more messaging systems regarding the presence of new messages therein; identifying a set of new messages for which a notification has not been cleared; presenting, to said user by said message notification means, a list of said set via a user interface; and permitting said user to select a particular message notification from said list for manipulation.

The advantages of the present invention include the ability to manage new messages, from a variety of message media, for which a notification has not been cleared in a single window that operates in conjunction with a main messaging system. The notification management permits manipulation of the message notifications without influencing the status of the messages themselves, while still providing access to the data contained in these messages.

In particular, the present invention provides a method of enhancing messaging systems which addresses the needs of those users who frequently check their incoming communications queues and need to determine very quickly which items need urgent attention and which ones can be deferred. The present invention further provides specific functionalities for handling a particular message when it does need urgent attention. For example, the present invention allows the user to quickly return telephone calls where the need to speak to the person is more imperative than hearing the voice message received.

BRIEF DESCRIPTION OF THE DRAWINGS

Embodiments of the present invention will now be further described, by way of example with reference to the accompanying drawings, in which.

DETAILED DESCRIPTION OF THE INVENTION

The present invention relates to an enhancement to messaging handling capabilities available in existing messaging systems. This is accomplished by incorporating an additional application module that alerts and allows a user to quickly view notifications of new messages for which a notification has not been cleared.

This application module, hereinafter referred to as "quick view", is preferably provided to the user by means of a graphical user interface (GUI). This GUI can be presented on any number of suitable devices such as, but not limited to: a desktop or laptop computer; a portable electronic device such as 3Com's Palm™ series or Research in Motion's Blackberry™ series; any other device operating on an operating system such as WindowsCE™, PalmOS™ or Java. Although the preferred embodiment employs a graphical user interface, it is equally possible to use the present invention with any of the variety of text user interfaces available such as those written in Wireless Markup Language (WML) on a Wireless Access Protocol (WAP) compliant telephone. It is also possible to use the present invention with known telephony user interfaces.

The quick view application module and the main messaging system, preferably a unified messaging system, can share the same messaging data. The enhanced functionality of viewing only those new messages for which a notification has not been cleared empowers the user to manage such messages quickly and efficiently. This may be achieved in a user friendly manner in which a given message notification can be opened, cleared from view or the sender can be called for a response by using, for example, standard graphical manipulation on a computer screen by means of point-and-click operations on a variety of menu choices and buttons.

Figure 1:
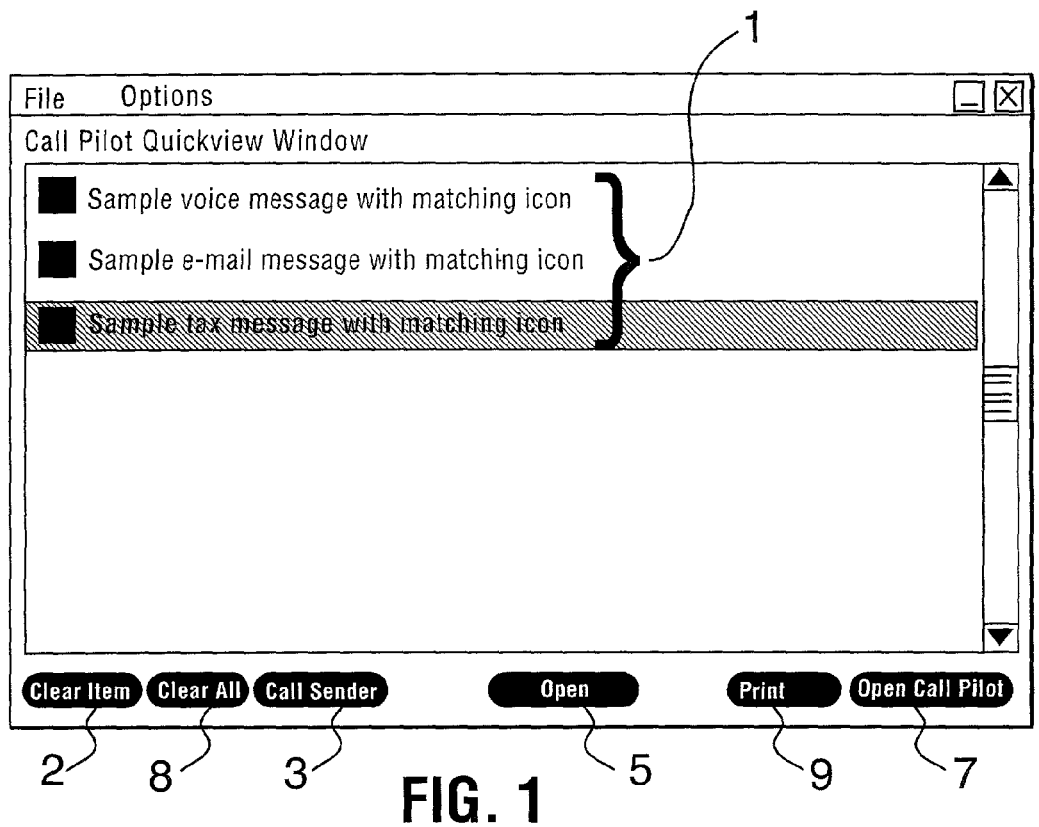
FIG. 1 illustrates a basic layout of a user interface employed with a message notification management system according to an embodiment of the present invention.

FIG. 1 shows a basic view of an embodiment of the quick view notification application. The figure illustrates the main notification viewer window, along with a menu bar on the top and a row of functionality buttons on the bottom. The main notification viewer lists only notifications for messages that are new and for which a notification has not been cleared. Within the main notification viewer window, a list of sample message notifications 1 is displayed. This list indicates the type of message for which a notification is being provided, along with a corresponding icon. The highlighted sample message in FIG. 1 is one that has been selected by the user for potential manipulation using any one of the features indicated on functionality buttons 2, 3, 5, 7, 8, and 9. The selection of one of these buttons may be performed by clicking on the button with a computer mouse pointer, selecting it with a series of keystrokes on a keyboard, or by means of any other similar selection device.

Selecting "Clear Item" button 2 will clear a selected message notification item from the quick view application. This feature permits the user to clear the notification of the selected message without deleting the message itself from the unified messaging system. Selecting "Call Sender" button 3 will enable the user to rapidly respond to a message notification. This permits the user to respond immediately to the sender of the selected message without the necessity of reading, hearing or seeing the entire contents of the message. Selecting "Open" button 5 enables the user to quickly play back the selected message, in the case of a voice or video message, or to display the selected message, in the case of a text, facsimile or electronic mail message.

Selecting "Open CallPilot" button 7 will launch the full functionality of the unified messaging application provided with the unified messaging system. This button can generally be referred to as an "open messaging application" button, and the button may be customized so as to reflect the name of the particular application being employed. In this case, reference is made to an embodiment wherein pressing this button will open the CallPilot unified messaging application mentioned earlier. By way of this button, the user is given not only access to the selected message for which the notification is given, but also to all of the added features that are normally associated with the unified messaging application. Selecting "Clear All" button 8 will clear the entire list of message notifications. Selecting "Print" button 9 permits the user to print on paper a facsimile or electronic mail message without having to open the message itself or change the status of the message or its notification.

Figure 2:
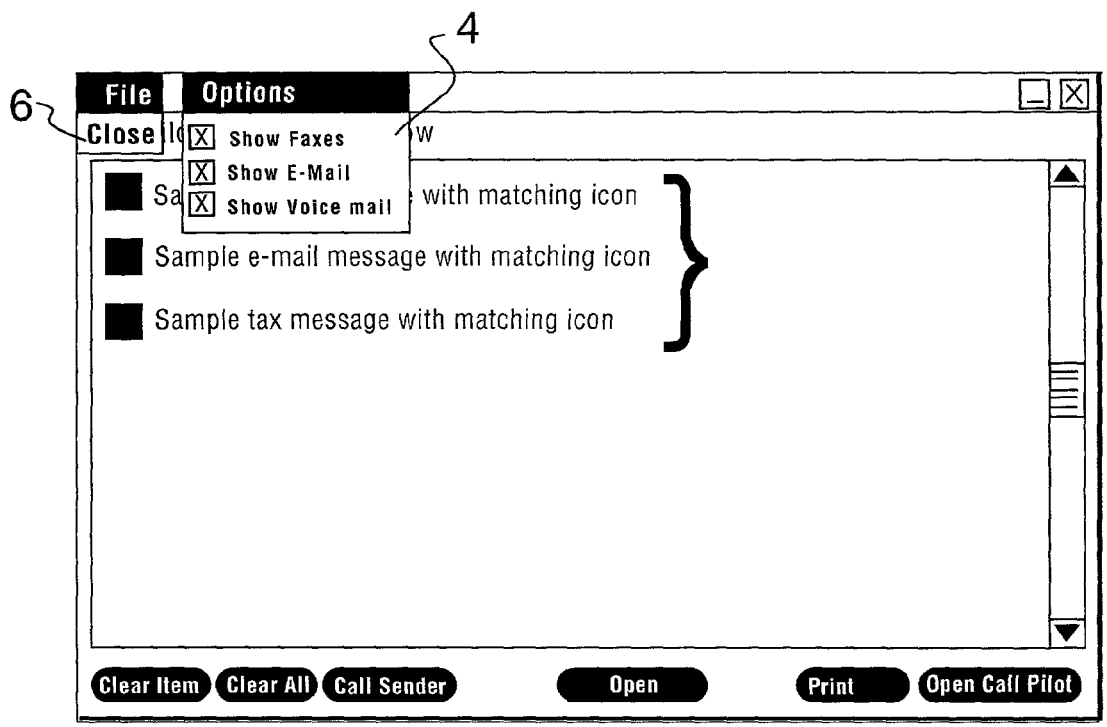
FIG. 2 illustrates the user interface of FIG. 1 showing the available menu options.

FIG. 2 illustrates a comprehensive view of a quick view application window that is similar to FIG. 1, except that all of the menu options available by way of the menu bar choices are shown. "Option" menu 4 enables the user to select which types of messages are to be included in the notification list. Selecting a box that corresponds with one of the listed menu items will instruct the quick view application to include that type of message in the message notification window. "File" menu 6 enables the user to exit the quick view application by selecting the "Close" menu option, as illustrated in FIG. 2.

In an embodiment of the present invention, the quick view application is integrated with a unified messaging application from which the quick view application may be launched. This may be achieved, for example, by selecting an option from a pull-down menu within the unified messaging application entitled "Open Quick View". This selection will launch the quick view notification application in the foreground, with the unified messaging application continuing to function in the background. In another embodiment of the present invention, the quick view application may be integrated within the unified messaging application itself and designated as a particular view style. This particular view style would be seamlessly integrated within the messaging application. This would be similar to the availability of 'normal' and 'page layout' view styles in word processing applications. As such, the user would be able to toggle between the quick view and the standard view within the messaging application.

Table 1 below provides sample messages and their attributes in order to more clearly explain how the two integrated embodiments of the present invention may determine which message notifications to display in the quick view list.

TABLE 1

Unified Messaging with Integrated Quick View Window

| Msg. No. | New | Notification Cleared |
|---|---|---|
| 1 | N | Y |
| 2 | Y | Y |
| 3 | Y | N |
| 4 | Y | N |

Of the messages listed in Table 1, only messages 3 and 4 would be presented in the quick view window since both are new and neither has had its notification cleared. Message 1 has been read and its notification has been cleared; therefore, it would show up in a message list as read, but would not appear in the quick view application. Message 2 has not been read, but its notification has been cleared. (This may be accomplished by setting a notification bit within the system to a value of "1".) Message 2 would show up in a message list as new, but would not appear in the quick view application. As soon as the user clears the notification for either of messages 3 or 4, the notification bit would be turned on (i.e. set to a value of 1), and the message would no longer appear in the list in the quick view application window.

In an alternate embodiment, a user could activate the quick view application as a standalone software notification application, independent of a unified messaging application.

In this alternate embodiment, the quick view application is involved in polling the unified messaging system for new messages. Table 2 provides sample messages and their attributes in order to more clearly explain how this standalone embodiment of the present invention may determine which message notifications to display in the quick view list.

TABLE 2

The Quick View Window in a Standalone Environment

| MESSAGING SYSTEM | | QUICK VIEW APPLICATION |
|---|---|---|
| Msg. No. | New | Msg. ID No. |
| 1 | N | |
| 2 | Y | |
| 3 | Y | 3 |
| 4 | Y | 4 |
| Last Notified Message Date = date for No. 4 | | |

Table 2 is somewhat similar to Table 1. The standalone implementation of the quick view application maintains a list of new messages whose notification has not been cleared by assigning a quick view message identification to them. In addition, the quick view application maintains a variable containing the date, time and sequence of each message.

Therefore, if the notification for message 3 were to be cleared, that notification would be removed from the quick view message identification list. The quick view application would periodically poll or check the unified messaging system, or other systems, to see if any new messages have arrived since the last notified messaging date. Also, the quick view application would verify that messages in its quick view message identification list had not been deleted or read on the unified messaging system. Protocols such as Internet Message Access Protocol (IMAP) are well known in the art and can be used to poll the unified messaging system for new messages, as well as to ascertain changes to the status of existing messages.

A further embodiment is possible in the case of the quick view application in another standalone environment. In this other environment, one or more messaging systems notify the quick view application of the presence of new messages. This "push"-type technology is in contrast to the "pull"-type technology exemplified by the polling example in the previous standalone embodiment. Table 3 provides sample messages and their attributes in order to more clearly explain how this other standalone embodiment of the present invention may determine which message notifications to display in the quick view list.

TABLE 3

The Quick View Window in Another Standalone Environment

| Message System | | Quick View Application |
|---|---|---|
| Msg. No. | New | Msg. ID No. |
| 1 | N | |
| 2 | Y | |
| 3 | Y | 3 |
| 4 | Y | 4 |

Table 3 shows a message attribute structure somewhat similar to that of the polling case. However, since it is the messaging systems that are notifying the quick view application of new messages as they arrive, as well as removals of notifications as messages are read or deleted, the quick view application no longer needs to store the date/time/sequence of the last notified message. The quick view application merely adds message identifications as it is notified, since any "new" message indication in this embodiment, regardless of date/time, needs to be added to the list. As in previous embodiments, each notification is deleted from the quick view when it is cleared by the user.

The relative advantages of the integrated and standalone implementations are dependent on the particular environment in which they will be deployed and will take into account factors such as software complexity, vendor interworking, etc. The standalone quick view application may have an advantage in cases wherein a plurality of distinct and heterogeneous messaging systems need to be monitored. Currently, definitions outlining modifications to existing protocols such as IMAP are complete and are being formalized by standards groups to permit "push" status notifications. The standalone embodiments of the quick view application would be ideally suited for use with these modified protocols.

As has been mentioned previously, although a graphical view of message notifications is preferred, it should be apparent to one skilled in the art that there would also be advantage in providing this kind of functionality where only an auditory interface is available, e.g. a telephone, or other speech-activated access to messages. In this case, the graphical list and functions would be replaced by an auditory list and DTMF-activated or spoken commands, both technologies being well known. While not as quickly used as a graphical display, it may be the most advantageous solution to mobile users who do not have graphical technology at their disposal.

What is claimed is:

1. A messaging system having integrated therewith a message notification means, said message notification means comprising:

memory means for storing message status information for messages in said messaging system;

means for determining from the stored message status information which messages in said messaging system are new and for which a notification has not been cleared, the means for determining being further operable to determine that one or more of the messages is new but has an associated notification that has been cleared;

a user interface for providing to a user a list of message notifications associated with only those messages determined to be new and for which a notification has not been cleared;

said message notification means permitting the user to select a particular notification from said list for manipulation.

2. A messaging system according to claim 1 wherein said manipulation consists of selecting a functionality associated with a plurality of options presented to the user.

3. A messaging system according to claim 2 wherein said plurality of options is presented visually by a plurality of buttons.

4. A messaging system according to claim 1 wherein said messaging system is a unified messaging system.

5. A messaging system according to claim 4 further comprising a filtering means for enabling said user to select which types of messages are to be included in said list.

6. A messaging system according to claim 5 wherein said user interface is a graphical user interface and wherein different icons are displayed beside different types of messages in said list.

7. A messaging system according to claim 1 wherein said manipulation consists of clearing said particular notification.

8. A messaging system according to claim 1 wherein said manipulation consists of clearing all notifications in said list.

9. A messaging system according to claim 2 wherein said functionality is selected from the group of: clear item, clear all, call sender, open, open messaging application, and print.

10. A messaging system according to claim 9 wherein said open messaging application functionality launches a messaging application associated with said messaging system.

11. A messaging system according to claim 9 wherein said call sender functionality replies to the sender of the selected message notification without retrieving the message itself.

12. A messaging system according to claim 1 wherein said integrated message notification means may be launched from within a messaging application associated with said messaging system.

13. A messaging system according to claim 1 wherein said integrated message notification means is designated as a particular view within a messaging application associated with said messaging system.

14. A method of enhancing a messaging system, said method comprising the steps of:

providing a message notification application integrated with a messaging application of said messaging system;

storing message status information for messages in said messaging system;

determining from the stored message status information which messages in said messaging system are new and for which a notification has not been cleared, and further determining whether one or more of the messages is new but has an associated notification that has been cleared;

presenting, to a user by said message notification means, a list of message notifications associated with only those messages determined to be new and for which a notification has not been cleared via a user interface; and permitting said user to select a particular message notification from said list for manipulation.

15. A message notification means for use with one or more messaging systems, said message notification means comprising:

polling means for polling said one or more messaging systems for new messages;

memory means for storing message status information for messages in said one or more messaging systems, said message status information comprising a message notification variable for each message, said variable comprising information for determining whether a notification has been cleared;

determining means for determining which messages in said messaging system are new and for which a notification has not been cleared, the determining means being further operable to determine that one or more of the messages is new but has an associated notification that has been cleared;

a user interface for providing to a user a list of message notifications associated with only those messages that are new and for which a notification has not been cleared;

said message notification means permitting the user to select a particular notification from said list for manipulation.

16. A message notification means according to claim 15 wherein said variable comprises information relating to date, time and sequence of each message.

17. A method of providing message notifications to a user, said user having access to one or more messaging systems, said method comprising the steps of:

providing a message notification means for use with said one or more messaging systems;

polling said one or more messaging systems, by said message notification means, for new messages;

storing message status information for messages in said messaging system;

determining from the stored message status information which messages in said messaging system are new and for which a notification has not been cleared, and further determining whether one or more of the messages is new but has an associated notification that has been cleared;

presenting, to a user by said message notification means, a list of message notifications associated with only those messages determined to be new and for which a notification has not been cleared via a user interface; and permitting said user to select a particular message notification from said list for manipulation.

18. A message notification means for use with one or more messaging systems, said message notification means comprising:

receiving means for receiving indications from said one or more messaging systems regarding the presence of new messages therein;

memory means for storing message status information for each message in said messaging system;

means for determining from the stored message status information which messages in said messaging system are new and for which a notification has not been cleared, the means for determining being further operable to determine that one or more of the messages is new but has an associated notification that has been cleared;

a user interface for providing to a user a list of message notifications associated with only those messages determined to be new and for which a notification has not been cleared;

said message notification means permitting the user to select a particular notification from said list for manipulation.

19. A method of providing message notifications to a user, said user having access to one or more messaging systems, said method comprising the steps of:

providing a message notification means for use with said one or more messaging systems;

receiving, at a receiving means within said message notification means, indications from said one or more messaging systems regarding the presence of new messages therein;

storing message status information for messages in said one or more messaging systems;

determining from the stored message status information which messages in said one or more messaging systems are new and for which a notification has not been cleared, and further determining whether one or more of the messages is new but has an associated notification that has been cleared;

presenting, to a user by said message notification means, a list of message notifications associated with only those messages determined to be new and for which a notification has not been cleared via a user interface; and permitting said user to select a particular message notification from said list for manipulation.

20. A message notification means according to claim 15 further comprising:

means for enabling said user to select which types of messages are to be included in the notification list.

* * * * *